(12) United States Patent
Lee et al.

(10) Patent No.: US 6,587,275 B2
(45) Date of Patent: Jul. 1, 2003

(54) LIGHT BEAM POLARIZATION CONVERTER FOR CONVERTING AN ILLUMINATION LIGHT SOURCE

(75) Inventors: Chih-Kung Lee, Taipei (TW); Chih-Ting Lin, Taipei (TW); Shu-Sheng Lee, Taipei (TW); Ching-Heng Tang, Taipei (TW)

(73) Assignee: Slight Opto-Electronics Co., Ltd., Taoyun (TW)

( * ) Notice: Subject to any disclaimer, the term of this patent is extended or adjusted under 35 U.S.C. 154(b) by 0 days.

(21) Appl. No.: 09/765,948

(22) Filed: Jan. 19, 2001

(65) Prior Publication Data

US 2002/0105710 A1 Aug. 8, 2002

(30) Foreign Application Priority Data

Dec. 1, 2000 (TW) ........................ 89125648 A

(51) Int. Cl.[7] .................. G02B 27/16; G02B 5/30; G02B 27/28
(52) U.S. Cl. .................... 359/620; 359/495
(58) Field of Search ................. 359/490, 495, 359/496, 619, 620, 626, 627

(56) References Cited

U.S. PATENT DOCUMENTS

| | | | | |
|---|---|---|---|---|
| 3,213,753 A | * | 10/1965 | Rogers | 88/65 |
| 5,751,480 A | * | 5/1998 | Kitagishi | 359/495 |
| 5,757,547 A | * | 5/1998 | Rodman et al. | 359/497 |
| 6,104,536 A | * | 8/2000 | Eckhardt | 359/619 |
| 6,147,802 A | * | 11/2000 | Itoh et al. | 359/495 |
| 6,335,051 B1 | * | 1/2001 | Kausch et al. | 427/163.1 |
| 6,262,842 B1 | * | 7/2001 | Ouderkirk et al. | 359/495 |
| 6,373,630 B1 | * | 4/2002 | Lee et al. | 359/495 |

* cited by examiner

Primary Examiner—Georgia Epps
Assistant Examiner—Alicia M. Harrington

(57) ABSTRACT

A light beam polarization converter converts non-polarized light beams of an illumination source having a plurality of polarization states into a single polarization state. The light beams from the bottom converged by the lower surface of the under plate and further parallelized by the upper surface thereof enter the converter. After a series of optical processes of polarization splitting, reflection or total reflection, and phase retardation within the converter, the light beams will pass through the converter as light beams of a single polarization state.

8 Claims, 11 Drawing Sheets

I

LIGHT BEAM POLARIZATION CONVERTER FOR CONVERTING AN ILLUMINATION LIGHT SOURCE

FIELD OF THE INVENTION

The present invention relates generally to a light beam polarization apparatus, and more particularly to a light beam polarization converter for electro-optical devices, such as liquid crystal projection displays.

DESCRIPTION OF THE PRIOR ART

With the advent of the information technology (IT) age, there is an increasing demand for various electro-optical displays, such as liquid crystal projection type displays. In this type of display, the light source is not inherently integrated, and thus an external source may be required for image display. As the demand for higher quality displays increases, it is becoming more and more important that the utilization efficiency of light sources be enhanced. A conventional way to increase efficiency is to convert the non-polarized light beams of a light source into linearly polarized light beams having a single polarization state, as disclosed in, for example U.S. Pat. No. 5,122,895 to Takanashi et al., wherein a conventional converter, the so-called P–S converter is disclosed. The P-polarized light component refers to the optical component of the electric field oscillation direction that is parallel to the plane of the incident light beam. The S-polarized light component is the optical component perpendicular to that plane.

As shown in prior art FIG. 1, in a conventional liquid crystal projection type display, the light beam emitted from a light source 10 is projected through a projection lens onto a screen (not shown) through the processing of a parallelizing lens 11, a diffusion plate 12, a P–S converter 13, color-splitting lenses 14 and 15, a reflecting mirror 16 and respective liquid crystal displays 301, 302 and 303. The main function of the P–S converter 13 is to reduce the optical loss of light beams when screened through the liquid crystal elements 301, 302 and 303 for specific polarization.

FIG. 2 shows a schematic perspective view of a conventional P–S converter 70. The non-polarized light beams I emitted from a light source travels upward from the bottom side of the P–S converter 70, and is converted therein and thereby emitted from the top side of the P–S converter 70 as a single S-polarized state light beam.

FIG. 3 shows a typical optical path of a light beam in a conventional P–S converter. One light beam (designated "I1") of a plurality of light beams emanating from the light source is representative. The light beam I1 is incident to the P–S converter through an anti-reflection film 70, and then subsequently becomes a light beam I2 having both P- and S-polarization states. The light beam I2 is then incident on a polarization splitting film 73 with a P-component I4 penetrating through and a S-component I3 being reflected. The P-component I4 is converted by a half-wave plate 78 and further travels through an anti-reflection film 79 as a light beam I6 of a single S-polarization state. The S-component I3 reflected by the splitting film 73 is further reflected by a highly reflective film 75 and then penetrates through an anti-reflection film 77 as a light beam I6 of a single S-polarization state.

Since the effect of polarization conversion described above may not be obtained if the light beam emitted from the light source is incident to the portion 81 as shown in FIG. 3, the conventional P–S converter only achieves efficiency of at best 50% in converting the polarization state of light beams. In addition, the configuration of conventional P–S converters is very complicated and carries relatively high manufacturing costs. It is also known in the art that a display incorporating such a conventional converter is notorious for high power consumption.

SUMMARY OF THE INVENTION

In view of the above problems, the principal object of the present invention is to provide a light beam polarization converter for converting an illumination source into a single polarization light source, which reduces the optical loss in light beam output, is suitable for mass production, and decreases manufacturing costs.

Another object of the present invention is to provide a light beam polarization converter for converting an illumination source into a single polarization light source, which is easily integrated with conventional devices and achieves highly efficient polarization conversion.

To achieve these objects, the present invention provides a light beam polarization converter for converting an illumination light source having a plurality of polarization states into a polarization light source, comprising an under plate having undulated lower and upper surfaces in conjugate to each other for converging and parallelizing the light beams respectively;

a substrate having an upper surface and a ridged lower surface disposed on the under plate;

a phase retardation film of high reflectivity disposed partially on the lower surface of the substrate; and a polarization splitting film disposed on the upper surface of the substrate, providing transmission of predetermined polarization states and reflection of predetermined polarization states of the illumination light source.

Another light beam polarization converter in accordance with the present invention is similar to the converter described above except that the phase retardation film is not included therein, and the lower surface of the substrate functions to proceed total reflection of the light beams, such that the conversion of the polarization states can be achieved.

The present invention further provide a light beam polarization converter for converting an illumination light source having a plurality of polarization states into a polarization light source, comprising an under plate having undulated lower and upper surfaces in conjugate to each other for converging and parallelizing the light beams respectively;

a substrate having a ridged upper surface and a ridged lower surface disposed on the under plate;

a phase retardation film of high reflectivity disposed partially on the lower surface of the substrate;

an upper cover having a ridged lower surface, substantially complementary to the ridged upper surface of the substrate and facing therewith, and an upper surface; and a thin film disposed between the upper cover and the substrate, the index of refraction thereof is different from that of the substrate.

Another light beam polarization converter in accordance with the present invention is similar to the converter described above except that the phase retardation film is not included therein, and the lower surface of the substrate functions to proceed total reflection of the light beams, such that the conversion of the polarization states can be achieved.

In order to enhance the optical performance, the ridge pitches between ridges on the upper and lower surfaces of the substrate and on the lower surface of the upper cover may be constant or not, and the direction of the polarized light beams reflected by the polarization splitting film or by the thin film and the upper cover should not be parallel to that of the ridge lines on the upper surface of the substrate, thus allowing greater freedom of converter design. Moreover, the undulations, such as cylindrical, spherical or non-spherical undulations, on the upper and lower surfaces of the under plate should be corresponding to each other in a conjugate way to ensure the light beams passing through in parallel, and thus enhance the transmitting efficiency of light beams passing through the converter. The ridged lower surface of the substrate is designed for total reflection of the light beams so as to proceed or even further enhance the conversion of the polarization states of the light beams.

Additional advantages, objects and features of the present invention will become more apparent from the drawings and description which follows.

BRIEF DESCRIPTION OF THE DRAWINGS

The present invention will become more apparent from the detailed description given hereinbelow when read in conjunction with the accompanying drawings, which are given by means of illustration only and thus are not limitative of the present invention, in which.

DETAILED DESCRIPTION OF THE PREFERRED EMBODIMENT

Figure 1:
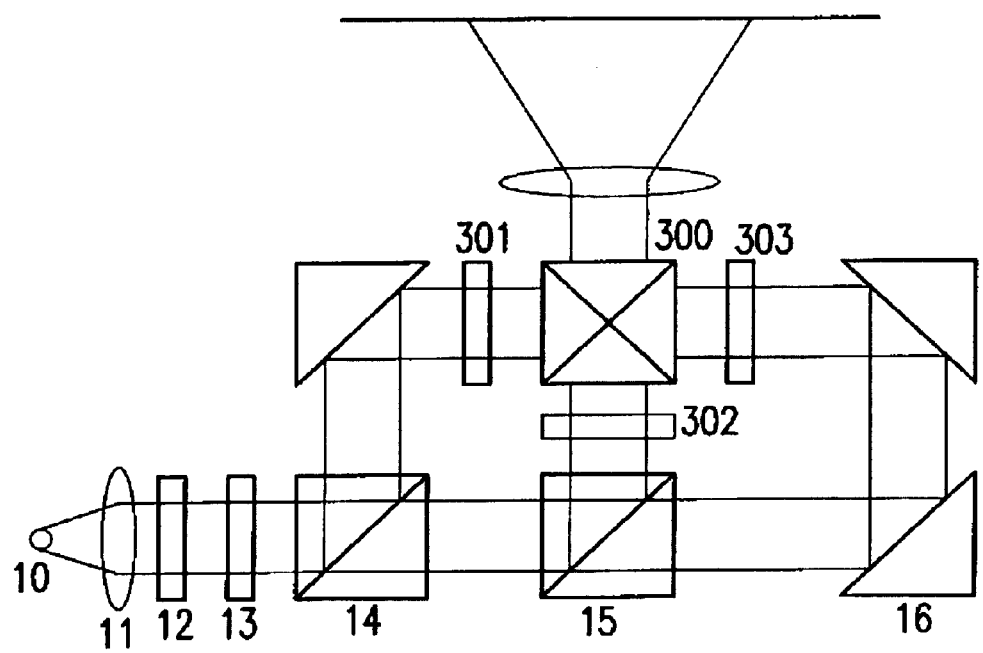
FIG. 1 is a schematic view of a conventional liquid crystal projection type television, showing the installation position and function of a P–S converter.
Figure 2:
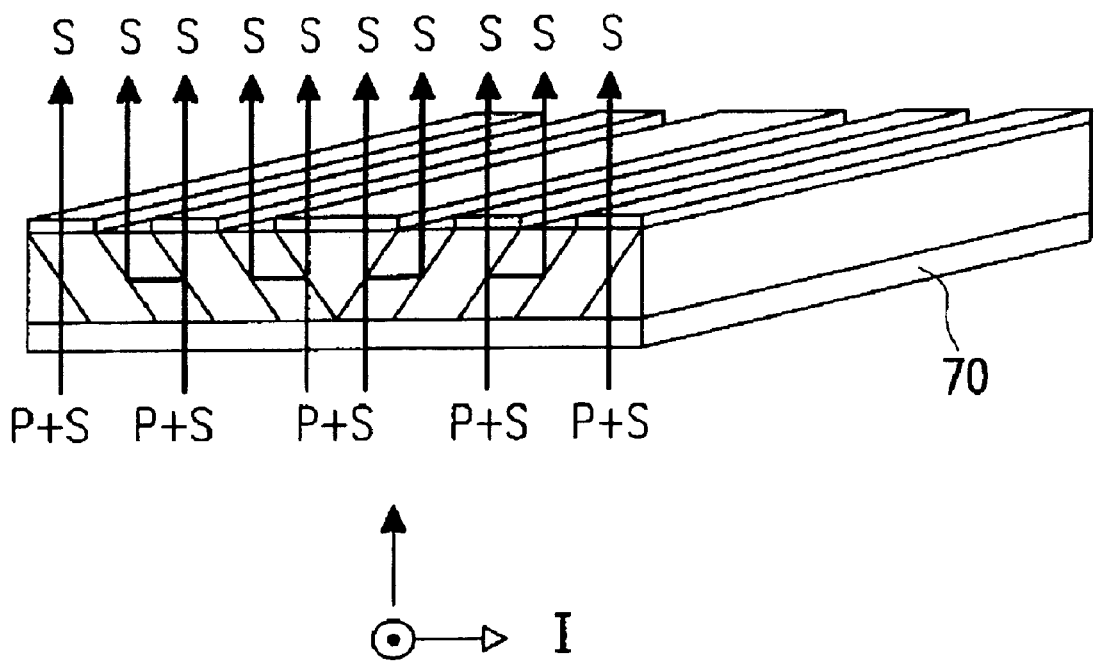
FIG. 2 is a perspective view showing a conventional P–S converter.
Figure 3:
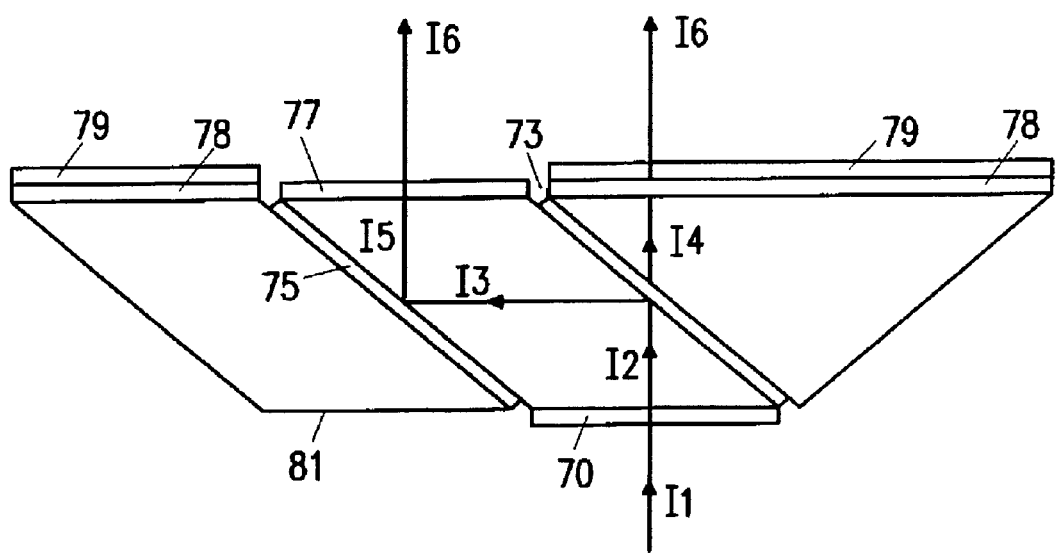
FIG. 3 illustrates an exemplary optical path traversing a conventional P–S converter.
Figure 4:
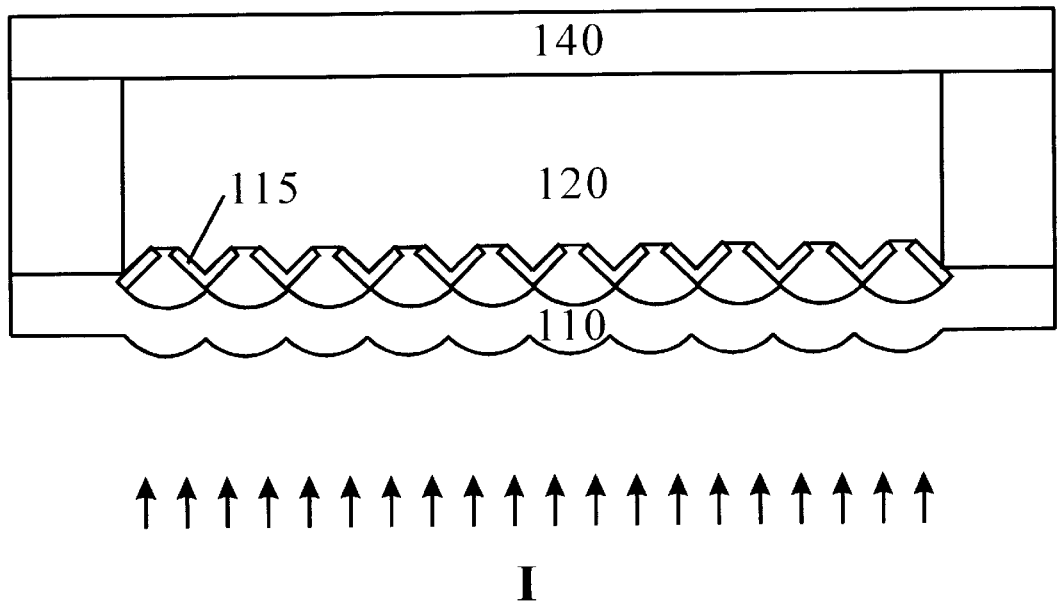
FIG. 4 is a cross sectional view showing a light beam polarization converter in accordance with the first embodiment of the present invention.

With reference to FIG. 4, a sectional view of a light beam polarization converter 100 in accordance with the first embodiment of the present invention is shown. The converter 100 is a laminate construction composed of an under plate 110, a substrate 120 and a polarization splitting film 140. A phase retardation film 115 is disposed partially on the lower surface of the substrate 120. The under plate 110 has an undulated lower surface for converging the light beams I from the bottom. A layer of anti-reflection film may be coated on the lower surface of the under plate 110 to increase the upward transmissivity of the light beams I. The upper surface of the under plate 110 is also an undulated surface, which functions to parallelize the light beams. Therefore, the under plate 110 becomes an optical system for converging and parallelizing the light beams. The substrate 120 has a ridged lower surface, and in this embodiment the ridge angle between two neighboring ridges is 90 degrees.

The phase retardation film is disposed partially on the lower surface of the substrate 120 such that the incident light beams converged and parallelized by the undulated upper and lower surfaces of the under plate 110 respectively can penetrate into the substrate 120 through the portions without phase retardation film thereon. The undulations on the upper and lower surfaces of the under plate 110 may be cylindrical, spherical or others. However, they need not be of specific profiles, but are designed for the purpose of converging and parallelizing the incident light beams I respectively.

Figure 5:
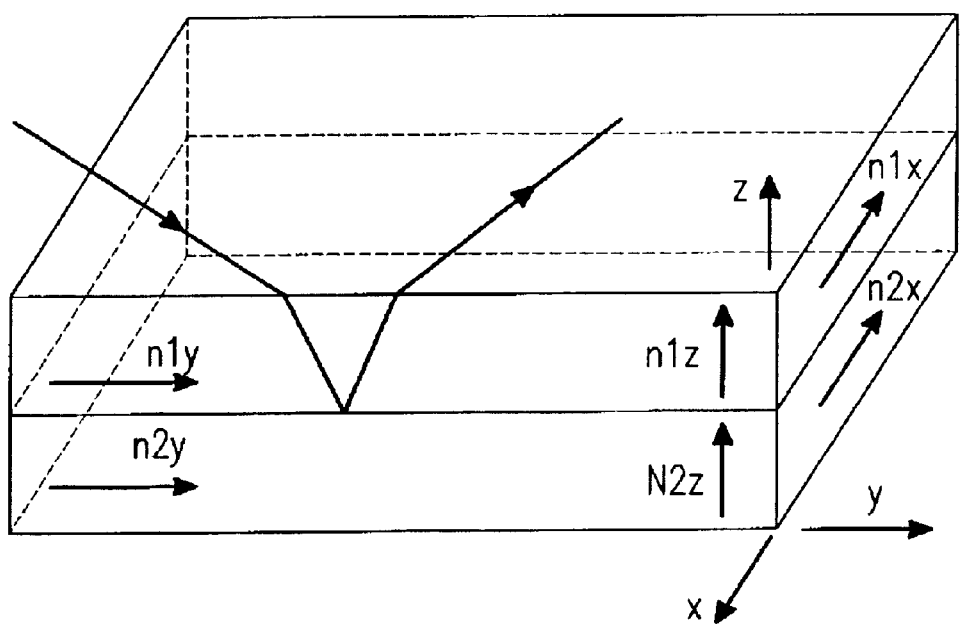
FIG. 5 is a schematic drawing showing a two-layer stack of films forming a single interface according to U.S. Pat. No. 5,962,114.

The polarization splitting film 140 is a film that permits light beams of specific polarization state to be transmitted through and others to be reflected. For example, the multi-layer film disclosed in U.S. Pat. No. 5,962,114, which is incorporated herein for reference, can be utilized as a polarization splitting film according to the present invention. FIG. 5 shows a two-layer stack of films forming a single interface according to U.S. Pat. No. 5,962,114, in which two films are laminated along the z-direction. The refractivity of the films along the x-, y- and z-direction are (n1x, n1y, n1z) (n2x, n2y, n2z) respectively. According to the teaching from U.S. Pat. No. 5,962,114, if (n1y–n2y) and (n1z–n2z) are of the same sign, the polarized light beam along the x-direction will be transmitted through the films and the polarized light beam along the y-direction will be reflected. Therefore, light beams of different polarization states can be splitted.

Figure 6:
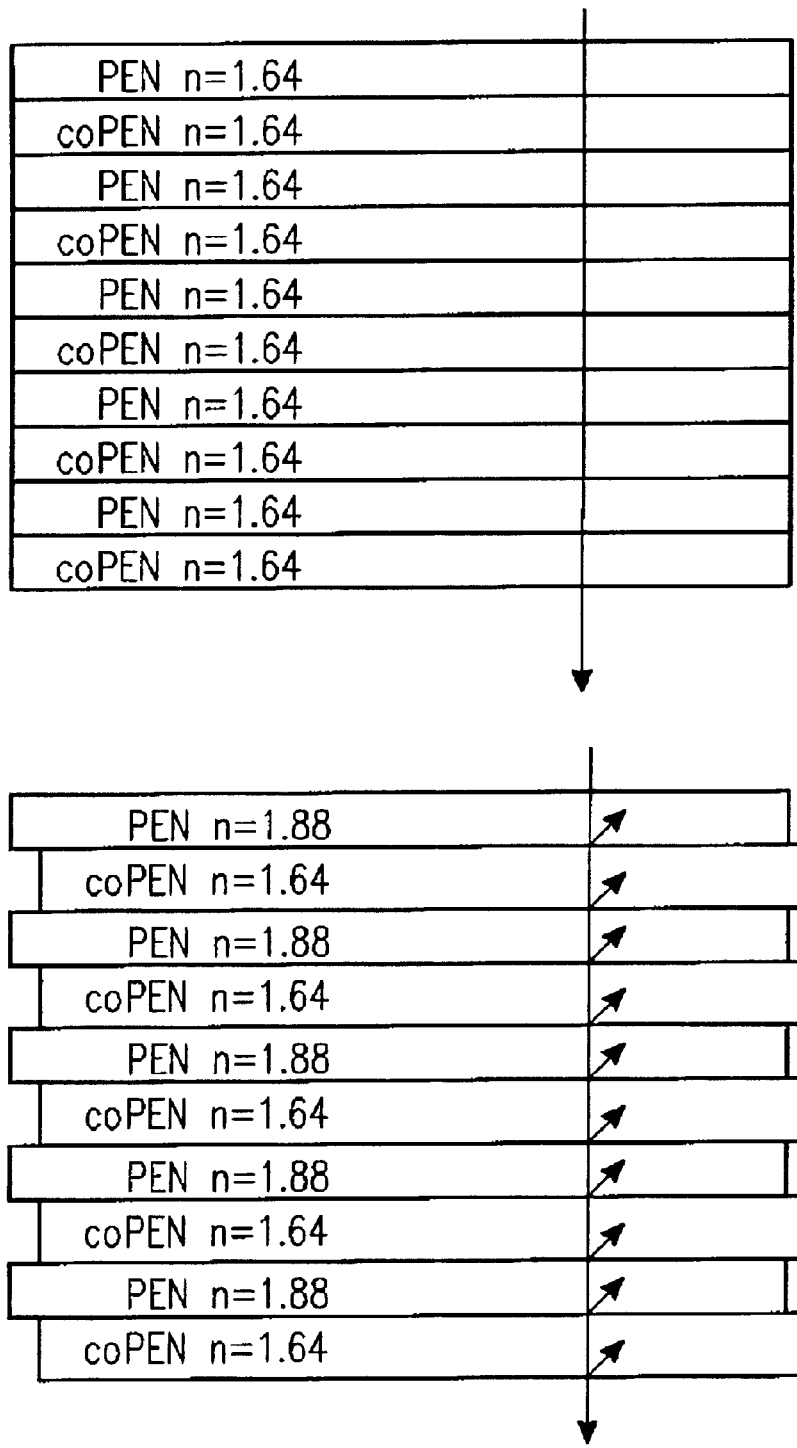
FIG. 6 is a schematic drawing, showing the reflection and transmission effect regarding light beams of two different polarization states according to U.S. Pat. No. 5,962,114.

FIG. 6 shows the reflection and transmission effect regarding light beams of two different polarization states according to the multilayer film of U.S. Pat. No. 5,962,114, which can be utilized in the present invention. The multi-layer film shown in FIG. 6 is composed of PEN (2,6-polyethylene naphthalate) and coPEN (copolymer derived from ethyleneglycol, naphthalene dicarboxylic acid and some other acids such as terephthalate) and allows polarized light beams in specific direction to be transmitted and others in the direction perpendicular to the specific direction to be reflected.

Figure 7:
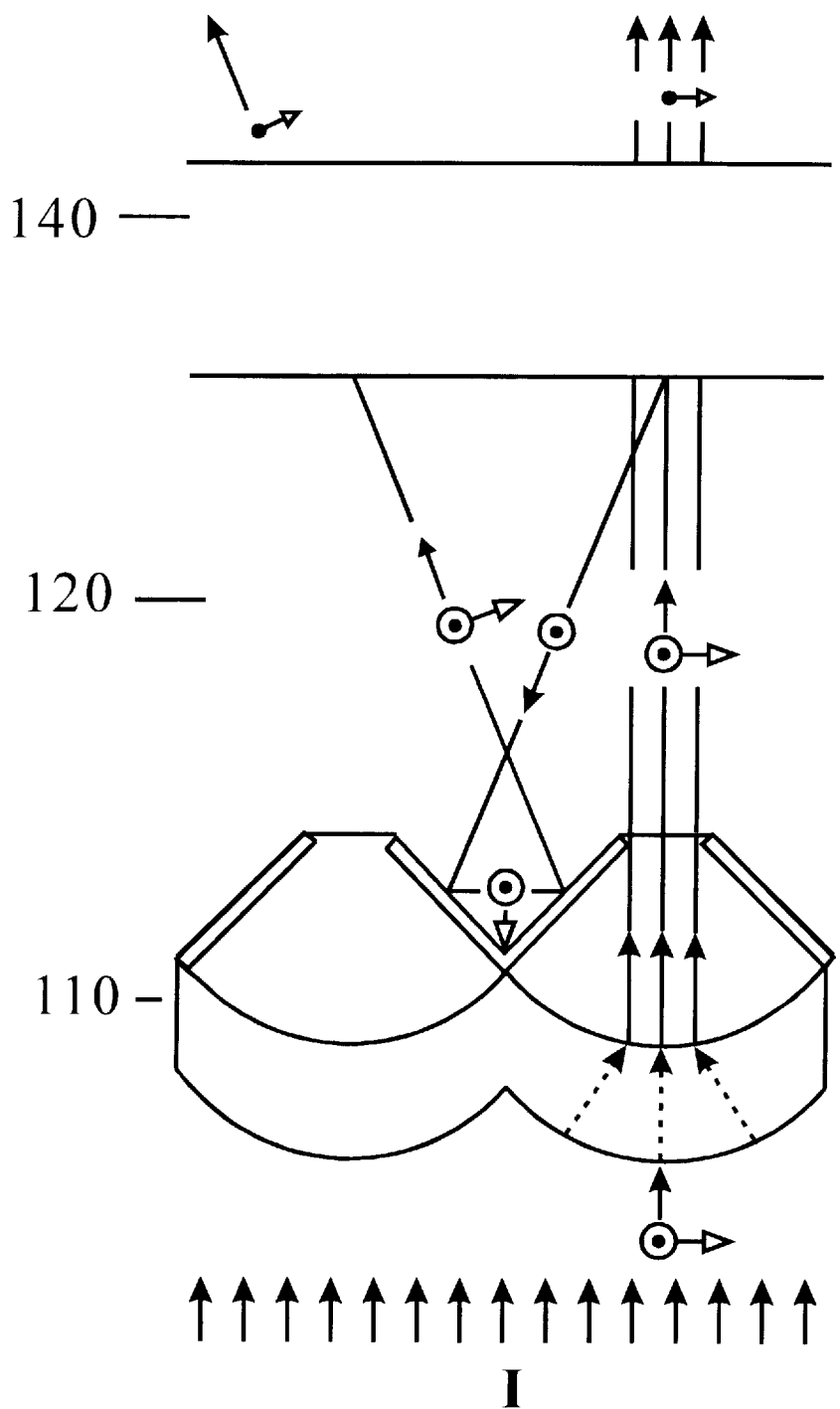
FIG. 7 is a schematic drawing showing the optical path in the light beam polarization converter in accordance with the first embodiment of the present invention.

With referenced to FIG. 7, an optical path, regarding light beams I entered from the under plate 110, between the under plate 110 and the polarization splitting film 140 is shown. In FIG. 7, the solid arrow designates the direction of the light beam propagating, the hollow arrow designates the P-polarized component, and the circle with a dot in it designates the S-polarized component. It should be noted that the P-polarized component means the component which may pass through the polarization splitting film, whereas the S-polarized component is perpendicular to the P-polarized component and will be reflected back by the polarization splitting film. In this case, an incident non-polarized light beam converged and parallelized by the undulated surfaces of the under plate 110 enters into the substrate 120 through the portions without phase retardation film thereon. The P-polarized component will directly pass through the polarization splitting film 140 and the S-polarized component will be reflected by the polarization splitting film 140. After the S-polarized component is continuously reflected at the ridged lower surface of the substrate 120, it will be converted by the phase retardation reflection film to possess P- and S-polarized components partially. Similarly, the P-polarized component will pass through the polarization splitting film 140, whereas the S-component will be reflected and converted again. Through a series of the above-mentioned procedures, the incident non-polarized light beam is output as a single P-polarized light beam. It is noted that in FIG. 7, the ridge pitch of the ridged surfaces of the substrate is constant.

It should be noted that while the direction of the S-polarized component reflected by the polarization splitting film 140 is not parallel to that of the ridge lines on the ridged lower surface of the substrate 120, any conventional reflection film may be advantageously utilized to achieve the effect by the phase retardation film disclosed in the present invention. Alternatively, while the direction of the S-polarized component is parallel to that of the ridge lines, the phase retardation effect and thereby the conversion of the polarization states cannot be achieve by the phase retardation film unless some magnetic materials are added therein.

The phase retardation film may be a dry film formed by an optical-precision application process or be coated through evaporation onto the ridged lower surface of the substrate 120, and further be removed at the unnecessary portions through polishing. Alternatively, the phase retardation film can be formed of materials having different optical coefficient. Moreover, the phase retardation effect and thereby the conversion of the polarization states can be achieved by the rough surfaces of the phase retardation film. In this embodiment, the ridge angle between two neighboring ridges of the substrate 120 is 90 degree, so that continuous reflection of the light beams can be achieved at the lower surface of the substrate 120.

The second embodiment of the present invention is a light beam polarization converter comprising the under plate 110, the substrate 120 and the polarization splitting film 140 as above except that the phase retardation film is not included therein. Since the phase retardation film is not included in this converter, S-polarized component reflected by the polarization splitting film 140 can not be converted by the phase retardation film to possess P- and S-polarized components partially. In order to achieve the conversion of the polarization states of the light beams, the lower surface of the substrate 120 is designed such that the light beams can proceed total reflection thereon so as to achieve the phase retardation effect and thereby the conversion of the polarization states. It should be noted that the direction of the S-polarized component reflected by the polarization splitting film should not be parallel to that of the ridges on the lower surface of the substrate so as to implement the phase retardation effect by total reflection.

For increasing the transmissivity of the light beams, films having surfaces of any suitable profiles can be attached to the upper surface of the polarization splitting film 140 such that the light beam can be outputted in parallel or at any suitable angle. In this way, the output angle as well as the diffusion angle of the polarized light beams may be controlled and determined, and thus the output illuminance over different angles of view may be predetermined.

Figure 8:
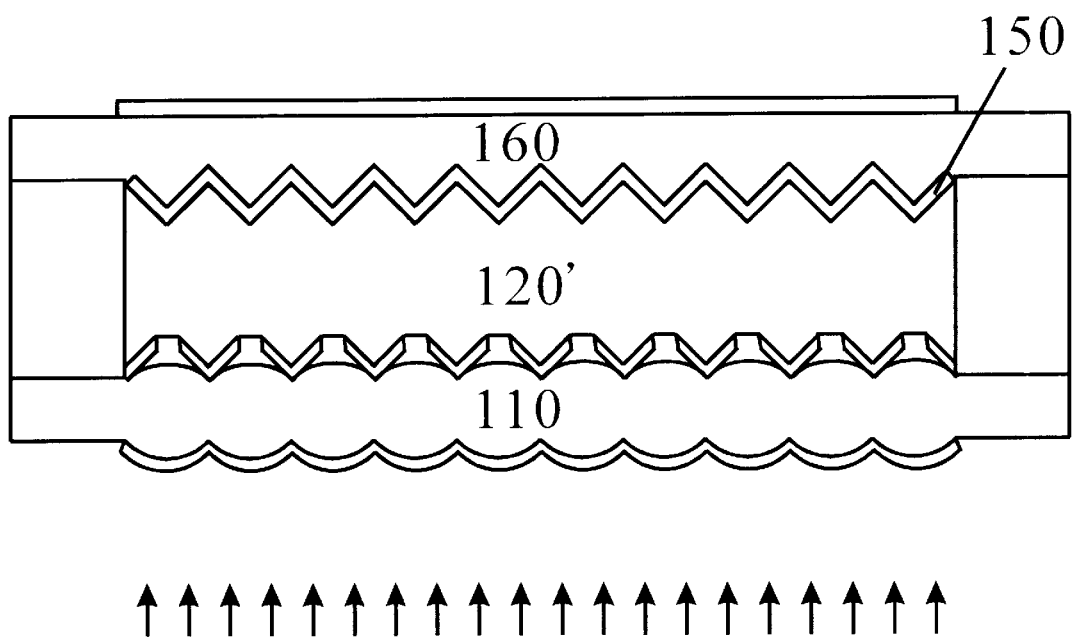
FIG. 8 is a cross sectional view showing a light beam polarization converter in accordance with the third embodiment of the present invention.

FIG. 8 is a sectional view showing a converter 100' according to the third embodiment of the present invention. The converter 100' is a laminate construction composed of an under plate 110, a substrate 120', a thin film 150 and an upper cover 160. The converter 100' is similar to the converter 100 in the first embodiment except that the polarization splitting film 140 of the first embodiment is replaced with an upper cover 160 disposed on the upper surface of the substrate 120' and a thin film 150 disposed between the upper cover 160 and the substrate 120'. The upper cover 160 has a ridged lower surface and an upper surface of unspecific profile. Accordingly, the upper surface of the substrate 120' is also a ridged surface substantially complementary to the lower surface of the upper cover 160. The index of refraction of the thin film 150 is different from that of the substrate 120' such that the polarization splitting can be effected at the thin film 150. Similarly, a phase retardation film (not shown) is disposed partially on the lower surface of the substrate 120' for converting the polarization states of the light beams. The under plate 110 has undulated lower and upper surfaces for converging and parallelizing the light beams I respectively. A layer of anti-reflection film may be coated on the lower surface of the under plate 110 to increase the upward transmissivity of the light beams I.

Figure 9:
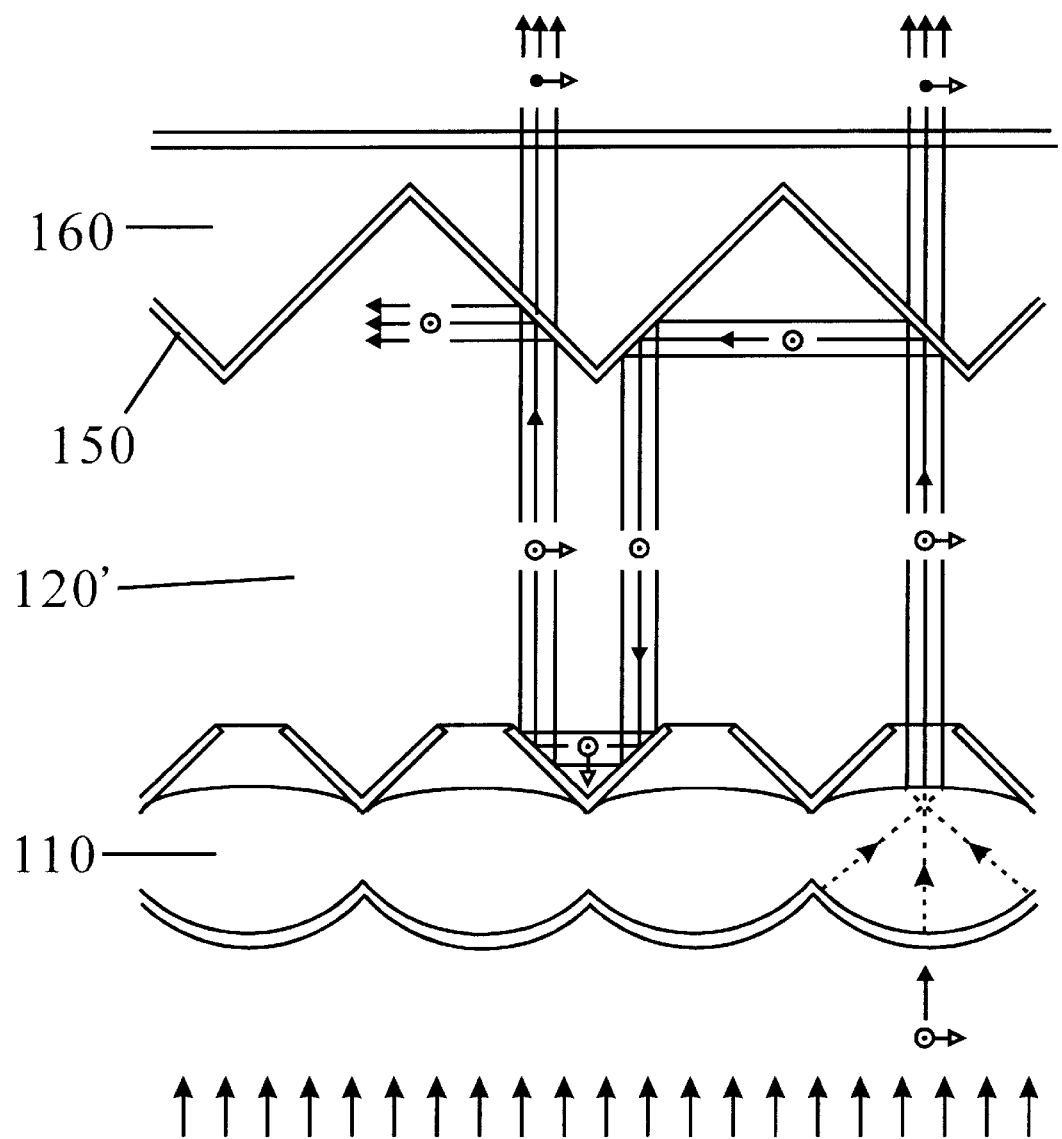
FIG. 9 is a schematic drawing showing the optical path in the light beam polarization converter in accordance with the third embodiment of the present invention.

With reference to FIG. 9, an optical path, regarding light beams I entered from the under plate 110, between the under plate 110 and the upper cover 160 is shown. In FIG. 9, the solid arrow designates the direction of the light beam propagating, the hollow arrow designates the P-polarized component, and the circle with a dot in it designates the S-polarized component. In this case, an incident non-polarized light beam converged and parallelized by the undulated surfaces of the under plate 110 enters into the substrate 120' through the portions without phase retardation film thereon. The P-polarized component will directly pass through the thin film 150 and enter the upper cover 160, whereas the S-polarized component will be reflected by the thin film 150. After the S-polarized component is continuously reflected at the ridged upper and lower surfaces of the substrate 120', it will be converted by the phase retardation reflection film to possess P- and S-polarized components partially. Similarly, the P-polarized component will pass through the thin film 150 and the upper cover 160, whereas the S-component will be reflected and converted again. Through a series of the above-mentioned procedures, the incident non-polarized light beam is output as a single P-polarized light beam. It is noted that in FIG. 9, the ridge pitch of the ridged surfaces of the substrate is constant.

As mentioned in the first embodiment, any conventional reflection film may be advantageously utilized to achieve the effect by the phase retardation film if the direction of the S-polarized component reflected by the polarization splitting film is not parallel to that of the ridge lines. Otherwise, certain magnetic material should be added into the film to achieve the phase retardation film disclosed in the present invention.

The fourth embodiment of the present invention is a converter similar to the converter in the third embodiment except that the phase retardation film is not included therein. As mentioned in the second embodiment in which a phase retardation film is not included, the lower surface of the substrate should be designed for light beams to proceed total reflection, such that the phase retardation effect and thereby the conversion of the polarization state can be achieved. It also should be noted that the direction of the S-polarized component reflected by the thin film and the upper cover should not be parallel to that of the ridges on the lower surface of the substrate so as to implement the phase retardation effect by total reflection.

For increasing the transmissivity of the light beams, films having surfaces of any suitable profiles can be attached to the upper surface of the upper cover 160 such that the light beam can be outputted in parallel or at any suitable angle. In this way, the output angle as well as the diffusion angle of the polarized light beams may be controlled and determined, and thus the output illuminance over different angles of view may be predetermined.

For clarifying the features of the present invention, the configuration and inventive principles of the present invention is in detail described below.

The upper and lower surfaces of the under plate 110 may have cylindrical, spherical or non-spherical undulation respectively and be corresponding to and in conjugate to each other so as to achieve the convergence and parallelization of the light beams. To sum up, the fundamental function of the under plate is to ensure that the incident light beam enters the substrate at high efficiency. The supplementary function of the upper surface of the under plate is to provide a place for attaching to the lower surface of the substrate, so that the undulations on the upper surface of the under plate are preferrably spherical. Notwithstanding the above, undulations of any profile other than the spherical may be deemed as falling within the scope of the present invention as defined in the claims.

While the upper and lower surfaces of the substrate are ridged, the ridge angles can be constant or not. The ridge pitches also can be constant or not so as to avoid the morie effect. However, the neighboring ridged surfaces of corresponding elements should be substantially complementary to each other, so as to facilitate the insertion of a film therebetween and the implementation of the total reflection effect.

Figure 10:
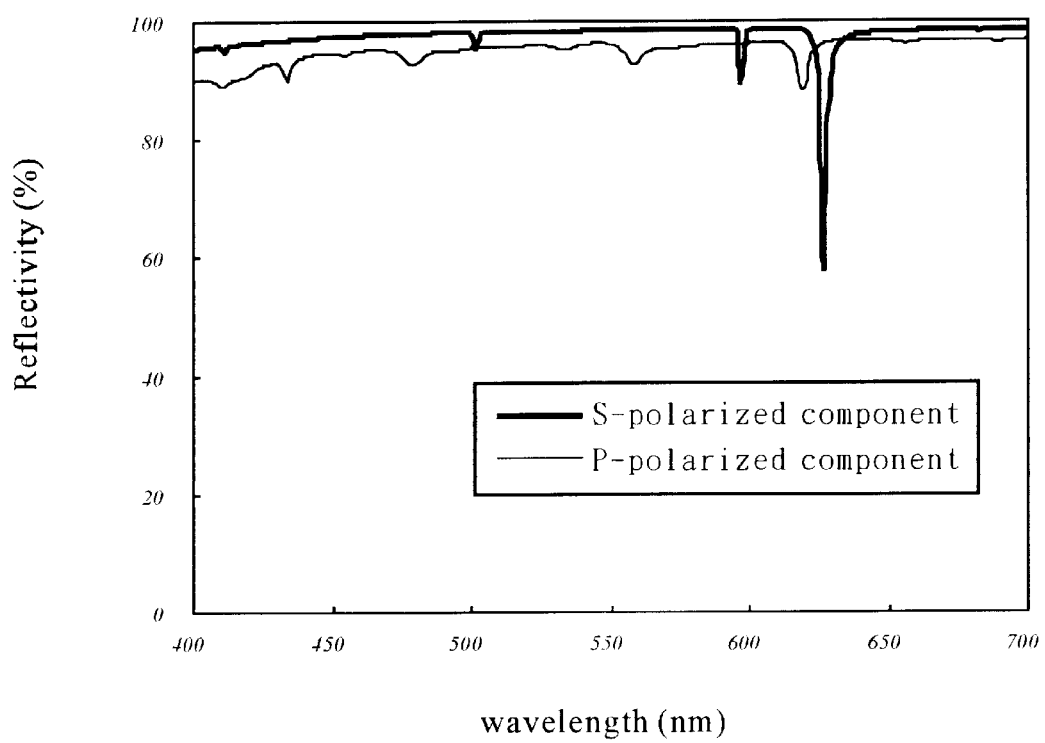
FIG. 10 shows the relationship between the reflectivity of P polarized component and S polarized component over different wavelengths of light beams incident to a typical phase retardation film of high reflectivity.
Figure 11:
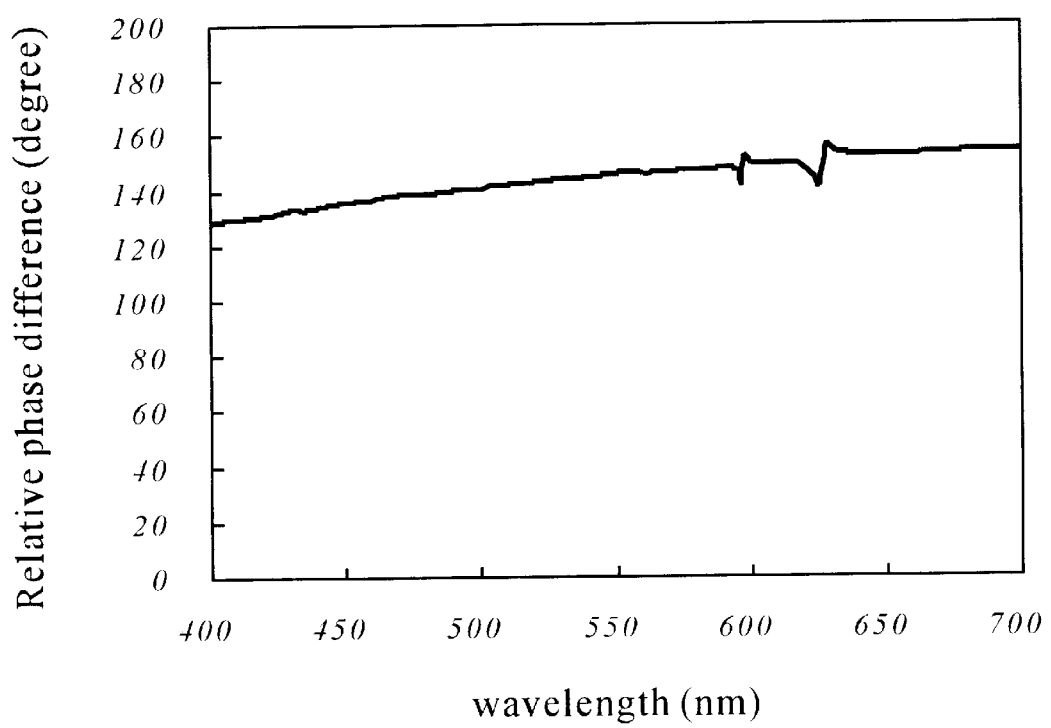
FIG. 11 shows the relationship between the relative phase difference of P and S polarized components over different wavelengths of light beams incident to a typical phase retardation film of high reflectivity.

In consideration of the production process, the substrate may be made of any suitable optical material, for example, plastic material such as PMMA, PC or ARTON™ or any other glass material, depending on the specific process therefor. In designing a suitable optical coating thereof, it is fundamental to determine the refractivity of the substrate in advance. Table 1 shows the refractivity over different wavelengths for ARTON™ at different absorption rate and temperature. With referenced to FIG. 10 and FIG. 11, the relative phase difference and reflectivity of P–S polarized components over different wavelengths of light beams incident to a typical phase retardation reflection film of high reflectivity are shown respectively.

It may be noted that in practical production, the phase retardation film is applied partially on the upper surface of the under plate. Therefore, the phase retardation film may first be applied wholly on the upper surface of the under plate and be partially removed at the unnecessary portion through polishing. For example, if the substrate is made of PMMA having optical coefficient 1.53 with the criteria that the ridge angle of the lower surface is 90 degrees and the wavelength of the incident light beam is 400 to 700 nm, the typical composition of the film and its thickness may be looked up from table 2. If the substrate is made of ARTON, under the same criteria as above, the composition can be looked up from table 3. In addition, the undulations on the lower and upper surfaces of the under plate for converging and parallelizing the light beams respectively can be made by procedures such as micro-electric-mechanical processes, injection molding or electro-forming.

Although the preferred embodiment of the present invention have been disclosed for illustrative purposes, those skilled in the art will appreciate that various modification, additions and substitutions are possible, without departing from the scope and spirit of the present invention as recited in the accompanying claims.

TABLE 1

ARTON FX26
Main Chain: NORBORNENE
Branch Chain: polyester function group

| | Measured wavelength | | | | |
|---|---|---|---|---|---|
| | 794.76 nm | 656 nm | 588 nm | 486 nm | 436 nm |
| Absorption rate (%) | | | | | |
| 0.01 | 1.5161 | 1.5198 | 1.5227 | 1.5298 | 1.5354 |
| 0.25 | 1.5163 | 1.5200 | 1.5230 | 1.5300 | 1.5357 |
| temperature (° C.) | | | | | |
| 30 | 1.515 | 1.519 | 1.521 | 1.528 | 1.534 |
| 40 | 1.514 | 1.518 | 1.520 | 1.527 | 1.533 |

TABLE 2

Typical phase retardation film as to composition and thickness
(unit: nm, substrate: PMMA)

ZnS 202.21, MgF$_2$ 200.00, ZnS 83.66, MgF$_2$ 200.00,
ZnS 58.46, MgF$_2$ 203.95, ZnS 200.19, MgF$_2$ 202.94,
ZnS 78.42, MgF$_2$ 184.10, ZnS 210.19, MgF$_2$ 196.94,
ZnS 235.49, MgF$_2$ 404.42, ZnS 105.38, MgF$_2$ 165.89,
ZnS 219.69, MgF$_2$ 207.75, ZnS 211.30, MgF$_2$ 184.61,
ZnS 57.30, MgF$_2$ 264.81, ZnS 168.19, MgF$_2$ 200.24,
ZnS 95.51, MgF$_2$ 146.82, ZnS 141.62, MgF$_2$ 62.71,
ZnS 61.65, MgF$_2$ 245.83, ZnS 203.82, MgF$_2$ 110.37,
ZnS 49.58, MgF$_2$ 136.26, ZnS 92.75, Ag 61.14

TABLE 3

Typical phase retardation film as to composition and thickness
(unit: nm, substrate: ARTON ™)

ZnS 202.44, MgF$_2$ 200.00, ZnS 83.68, MgF$_2$ 200.00,
ZnS 60.66, MgF$_2$ 206.53, ZnS 200.00, MgF$_2$ 200.00,
ZnS 85.56, MgF$_2$ 176.92, ZnS 207.83, MgF$_2$ 186.64,
ZnS 228.17, MgF$_2$ 450.70, ZnS 102.87, MgF$_2$ 163.44,
ZnS 223.36, MgF$_2$ 193.18, ZnS 206.10, MgF$_2$ 180.03,
ZnS 62.29, MgF$_2$ 255.92, ZnS 180.50, MgF$_2$ 238.48,
ZnS 81.97, MgF$_2$ 133.27, ZnS 132.49, MgF$_2$ 101.40,
ZnS 62.55, MgF$_2$ 264.24, ZnS 189.91, MgF$_2$ 85.94,
ZnS 59.96, MgF$_2$ 140.79, ZnS 89.76, Ag 60.92

What is claimed is:

1. A light beam polarization converter for converting an illumination light source having a plurality of polarization states into a polarization light source, comprising:

an under plate having undulated lower and upper surfaces in conjugate to each other for converging and parallelizing the light beams respectively;

a substrate having a ridged upper surface and a ridged lower surface disposed on the under plate;

a phase retardation film of high reflectivity disposed partially on the lower surface of the substrate;

an upper cover having a ridged lower surface, substantially complementary to the ridged upper surface of the substrate and facing therewith, and an upper surface; and a thin film disposed between the upper cover and the substrate, the index of refraction thereof is different from that of the substrate.

2. The light beam polarization converter according to claim 1, wherein the phase retardation film is a dry film formed by an optical-precision application process.

3. The light beam polarization converter according to claim 1, further comprising an undulated film disposed on the upper surface of the upper cover.

4. The light beam polarization converter according to claim 1, further comprising an anti-reflection film disposed on the undulated lower surface of the under plate.

5. A light beam polarization converter for converting an illumination light source having a plurality of polarization states into a polarization light source, comprising:

an under plate having undulated lower and upper surfaces in conjugate to each other for converging and parallelizing the light beams respectively;

a substrate having a ridged upper surface and a ridged lower surface providing total reflection of the light beams disposed on the under plate;

an upper cover having a ridged lower surface, substantially complementary to the ridged upper surface of the substrate and facing therewith, and an upper surface; and a thin film disposed between the upper cover and the substrate, the index of refraction thereof is different from that of the substrate.

6. The light beam polarization converter according to claim 5, wherein the phase retardation film is a dry film formed by an optical-precision application process.

7. The light beam polarization converter according to claim 5, further comprising an undulated film disposed on the upper surface of the upper cover.

8. The light beam polarization converter according to claim 5, further comprising an anti-reflection film disposed on the undulated lower surface of the under plate.

* * * * *